US010432658B2

(12) United States Patent
Back et al.

(10) Patent No.: US 10,432,658 B2
(45) Date of Patent: Oct. 1, 2019

(54) SYSTEMS AND METHODS FOR IDENTIFYING AND PERFORMING AN ACTION IN RESPONSE TO IDENTIFIED MALICIOUS NETWORK TRAFFIC

(71) Applicant: WATCHGUARD TECHNOLOGIES, INC., Seattle, WA (US)

(72) Inventors: Gregory Thomas Back, Hendersonville, TN (US); Patrick Michael Cloke, Somerville, MA (US); Stephen Ralph Dicato, Jr., Lynnfield, MA (US); Daniel Eugenio Espinal, Wellesley Hills, MA (US); Todd Aaron O'Boyle, Edwardsville, IL (US); John Sheldon Serafini, Hingham, MA (US)

(73) Assignee: WATCHGUARD TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/600,885

(22) Filed: Jan. 20, 2015

(65) Prior Publication Data

US 2015/0207812 A1    Jul. 23, 2015

Related U.S. Application Data

(60) Provisional application No. 61/928,841, filed on Jan. 17, 2014.

(51) Int. Cl.
*H04L 29/06* (2006.01)
(52) U.S. Cl.
CPC ...... *H04L 63/1441* (2013.01); *H04L 63/1408* (2013.01)

(58) Field of Classification Search
CPC ............. H04L 63/1408; H04L 63/1441; H04L 63/145; H04L 63/1425; H04L 63/1416; H04L 2463/144; G06F 21/50; G06F 21/552
USPC .......................................................... 726/23
See application file for complete search history.

(56) References Cited

U.S. PATENT DOCUMENTS

| 5,960,170 A * | 9/1999 | Chen ...................... G06F 21/564 714/26 |
| 7,814,542 B1 * | 10/2010 | Day ..................... H04L 63/1408 713/188 |
| 8,561,177 B1 * | 10/2013 | Aziz ...................... G06F 21/554 726/22 |
| 8,561,188 B1 * | 10/2013 | Wang .................. H04L 63/1425 713/176 |

(Continued)

*Primary Examiner* — Jahangir Kabir
(74) *Attorney, Agent, or Firm* — AEON Law, PLLC; Adam L. K. Philipp; Jonathan E. Olson

(57) ABSTRACT

Computer-implemented systems, methods, and computer-readable media are provided for causing an action to be performed in response to a network communication, such as a malicious network communication. In accordance with some embodiments, a first network communication sent from a client device is received, and a protocol used in the first network communication is determined. Once the protocol is determined, the protocol may be implemented to enable a second network communication with the client device. An action to be performed based at least in part on the protocol may be identified, and an instruction may be sent to the client device in the second network communication.

16 Claims, 9 Drawing Sheets

(56) References Cited

U.S. PATENT DOCUMENTS

| | | | | |
|---|---|---|---|---|
| 8,566,928 B2 * | 10/2013 | Dagon | H04L 29/12066 | 726/22 |
| 8,578,493 B1 * | 11/2013 | Cowan | G06F 21/554 | 709/224 |
| 8,782,793 B2 * | 7/2014 | Zaitsev | G06F 21/56 | 713/187 |
| 8,869,268 B1 * | 10/2014 | Barger | G06F 21/552 | 709/224 |
| 8,904,530 B2 * | 12/2014 | Liu | G06F 21/566 | 709/206 |
| 9,189,626 B1 * | 11/2015 | Overfield | G06F 21/56 | |
| 9,219,744 B2 * | 12/2015 | Baliga | H04L 63/1425 | |
| 9,325,735 B1 * | 4/2016 | Xie | H04L 63/145 | |
| 9,336,385 B1 * | 5/2016 | Spencer | H04L 63/1441 | |
| 9,619,651 B1 * | 4/2017 | Leavy | G06F 11/3672 | |
| 9,635,039 B1 * | 4/2017 | Islam | H04L 63/1408 | |
| 10,133,867 B1 * | 11/2018 | Brandwine | H04L 63/1408 | |
| 2004/0109518 A1 * | 6/2004 | Miller | G06Q 20/027 | 375/356 |
| 2004/0255161 A1 * | 12/2004 | Cavanaugh | H04L 63/1408 | 726/23 |
| 2006/0026671 A1 * | 2/2006 | Potter | H04L 63/08 | 726/7 |
| 2006/0161980 A1 * | 7/2006 | Huitema | H04L 63/14 | 726/22 |
| 2006/0218640 A1 * | 9/2006 | Lotem | G06F 21/577 | 726/25 |
| 2007/0094723 A1 * | 4/2007 | Short | H04L 69/16 | 726/14 |
| 2007/0097976 A1 * | 5/2007 | Wood | H04L 63/1416 | 370/392 |
| 2008/0196104 A1 * | 8/2008 | Tuvell | H04L 12/585 | 726/24 |
| 2009/0077383 A1 * | 3/2009 | de Monseignat | H04L 63/0823 | 713/175 |
| 2009/0254989 A1 * | 10/2009 | Achan | H04L 63/1441 | 726/22 |
| 2009/0282482 A1 * | 11/2009 | Huston | G06F 21/554 | 726/23 |
| 2010/0107237 A1 * | 4/2010 | Kitamura | H04L 63/08 | 726/12 |
| 2010/0188991 A1 * | 7/2010 | Raleigh | G06Q 10/06375 | 370/252 |
| 2011/0055921 A1 * | 3/2011 | Narayanaswamy | H04L 63/1458 | 726/22 |
| 2011/0131654 A1 * | 6/2011 | Taneja | H04L 63/1416 | 726/23 |
| 2011/0302656 A1 * | 12/2011 | El-Moussa | H04L 63/1425 | 726/24 |
| 2012/0158975 A1 * | 6/2012 | Hogoboom | H04L 69/22 | 709/228 |
| 2012/0204264 A1 * | 8/2012 | Jiang | H04L 41/12 | 726/23 |
| 2012/0233694 A1 * | 9/2012 | Baliga | G06F 21/568 | 726/23 |
| 2012/0260304 A1 * | 10/2012 | Morris | G06F 21/56 | 726/1 |
| 2012/0331556 A1 * | 12/2012 | Alperovitch | H04L 63/1408 | 726/23 |
| 2013/0097706 A1 * | 4/2013 | Titonis | G06F 21/56 | 726/24 |
| 2013/0133072 A1 * | 5/2013 | Kraitsman | H04L 63/1408 | 726/23 |
| 2013/0174246 A1 * | 7/2013 | Schrecker | H04L 63/029 | 726/14 |
| 2013/0174253 A1 * | 7/2013 | Thomas | H04L 63/1416 | 726/22 |
| 2013/0174254 A1 * | 7/2013 | Gould | H04L 63/1441 | 726/22 |
| 2013/0227636 A1 * | 8/2013 | Bettini | H04W 4/001 | 726/1 |
| 2013/0263266 A1 * | 10/2013 | Bojaxhi | H04L 63/145 | 726/23 |
| 2013/0305368 A1 * | 11/2013 | Ford | G06F 21/568 | 726/23 |
| 2013/0312097 A1 * | 11/2013 | Turnbull | G06F 21/55 | 726/24 |
| 2014/0007238 A1 * | 1/2014 | Magee | G06F 21/577 | 726/24 |
| 2014/0033310 A1 * | 1/2014 | Cheng | H04L 63/1416 | 726/23 |
| 2014/0157405 A1 * | 6/2014 | Joll | H04L 63/1425 | 726/22 |
| 2014/0250524 A1 * | 9/2014 | Meyers | G06F 21/554 | 726/22 |
| 2014/0283030 A1 * | 9/2014 | Moore | H04L 63/0236 | 726/22 |
| 2015/0007250 A1 * | 1/2015 | Dicato, Jr. | G06F 21/50 | 726/1 |
| 2015/0020188 A1 * | 1/2015 | Segal | H04L 63/0227 | 726/13 |
| 2015/0047032 A1 * | 2/2015 | Hannis | H04L 63/1491 | 726/23 |
| 2015/0135316 A1 * | 5/2015 | Tock | G06F 21/56 | 726/23 |
| 2015/0195299 A1 * | 7/2015 | Zoldi | H04L 63/1433 | 726/25 |
| 2015/0326599 A1 * | 11/2015 | Vissamsetty | H04L 63/02 | 726/11 |

\* cited by examiner

Domains    Protocols    Infections    Connections    User1
710        720          730                740            750

Infections

| Domain | Port | Protocol | Victim | First Seen | Last Seen | Status | |
|---|---|---|---|---|---|---|---|
| Example1.com | 80 | HTTP | 11.11.11.11 | 4 days, 6 hours ago | 4 days, 6 hours ago | Not resolved Not connected | View Infection |
| Example2.org | 3460 | Poison Ivy | VICTIM-01 (22.222.222.22) | 5 days, 11 hours ago | 2 days, 13 hours ago | Not resolved Not connected | View Infection |
| None | 6667 | IRC | User5 (33.333.333.33) | 5 days, 11 hours ago | 5 days, 11 hours ago | Resolved | View Infection |

Fig. 7

SYSTEMS AND METHODS FOR IDENTIFYING AND PERFORMING AN ACTION IN RESPONSE TO IDENTIFIED MALICIOUS NETWORK TRAFFIC

RELATED APPLICATIONS

This application claims priority to U.S. Provisional Patent Application No. 61/928,841, filed Jan. 17, 2014, the contents of which are incorporated herein by reference.

TECHNICAL FIELD

The present disclosure relates to computerized systems and methods for performing an action in response to identified network traffic, and more generally, to network security technologies. By way of example, and without limitation, the present disclosure relates to computerized systems and methods for identifying malicious network traffic, and for causing an action to be performed in response to the malicious traffic.

BACKGROUND

The use of electronic devices to access content over networks has grown significantly over the years. People can now interact with content over networks using a variety of electronic devices. The ability to access content over networks, such as the Internet, has been great for connecting people to information. Unfortunately, certain individuals have designed malware, short for malicious software, to compromise innocent computer systems connecting to these networks.

Malware is software that is designed for hostile or intrusive purposes. Malware may be designed, for example, for gathering information, accessing resources without authorization, or other malicious purposes. Examples of different types of malware include computer viruses, worms, trojan horses, spyware, adware, and bots (short for "robots"). Some types of malware allow a remote attacker to control an infected computer. These types of malware may use network communications, known as "Command and Control" or "C2" channels, to maintain a connection between the attacker and the compromised computer. The attacker may control the infected computer to carry out malicious activities such as e-mail spam, click fraud, distributed denial-of-service attacks (DDoS), or identity theft. Attackers may use clandestine ways of distributing the malware, so that users of compromised devices are not aware that the malware is on their devices.

Malware may store information or have an algorithm for identifying a domain name or IP address of an attacker to contact when a certain event occurs (e.g., when a user opens the malware application, when a certain time occurs). This contact may open a communication channel by which an attacker can control the infected computer. Attackers often use the domain name system (DNS) to obtain control of infected host computers. DNS is a hierarchical lookup service used on the Internet to map character-based domain names into numerical Internet Protocol (IP) addresses. By storing a domain name, rather than an IP address, in the malware, an attacker can change their IP address over time to avoid detection. The infected computer will still connect to the current IP address of the attacker through resolution of the domain name from DNS.

As use of the Internet continues to grow, malware developers have more incentives than ever for developing and releasing their software. In order to protect computers from becoming compromised by malware, there has been a growing demand for security technologies, such as anti-virus software, intrusion detection systems, and firewalls. However, developers of malicious software still find ways to evade existing security technologies.

SUMMARY

Embodiments of the present disclosure relate to computerized systems and methods for performing an action in response to identified network traffic. In addition, embodiments of the present disclosure relate to identifying malicious network traffic, and causing an action to be performed in response to the malicious network traffic.

In accordance with certain embodiments of the present disclosure, computerized systems and methods are provided that receive a first network communication from a client device, and determine a protocol used in the first network communication. Once the protocol has been identified, the computerized systems and methods may implement the protocol to connect with the client device, and may cause a second network communication to be sent to the client device with an instruction to perform an action.

In accordance with some embodiments, there is provided a computer-implemented method for causing an action to be performed in response to a network communication. The method comprises receiving a first network communication sent from a client device, and determining a protocol used in the first network communication. The method also comprises implementing the protocol, by at least one processor, to enable a second network communication with the client device, and identifying an action to be performed based at least in part on the protocol. The method further comprises causing an instruction to perform the action to be sent to the client device in the second network communication.

Furthermore, in accordance with some embodiments, there is provided a computer-implemented system for causing an action to be performed in response to a network communication. The system comprises a memory device that stores instructions, and one or more processors that execute the instructions. The one or more processors execute the instructions to receive a first network communication sent from a client device, and to determine a protocol used in the first network communication. The one or more processors also execute the instructions to implement the protocol to enable a second network communication with the client device, and to identify an action to be performed based at least in part on the protocol. The one or more processors further execute the instructions to cause an instruction to perform the action to be sent to the client device in the second network communication.

Additionally, in accordance with some embodiments, there is provided a non-transitory computer-readable medium that stores instructions. The instructions, when executed by one or more processors, cause the one or more processors to perform a method. The method comprises receiving a first network communication sent from a client device, and determining a protocol used in the first network communication. The method also comprises implementing the protocol to enable a second network communication with the client device, and identifying an action to be performed based at least in part on the protocol. The method further comprises causing an instruction to perform the action to be sent to the client device in the second network communication.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

FIG. 7 illustrates an example screen of a user interface for viewing infections, consistent with embodiments of the present disclosure.

DETAILED DESCRIPTION OF EXAMPLE EMBODIMENTS

Figure 1:
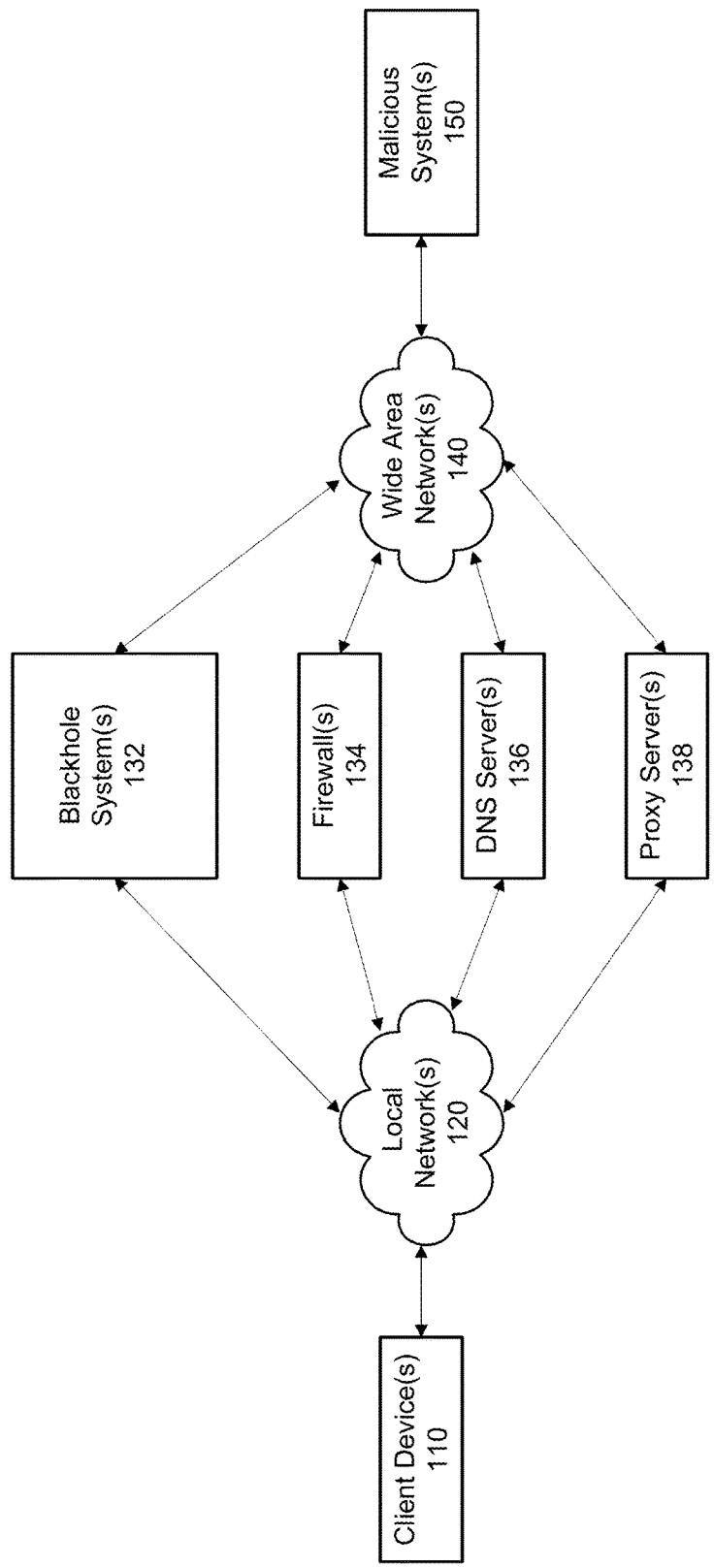
FIG. 1 illustrates a diagram of an example computing environment for implementing embodiments consistent with the present disclosure.

Reference will now be made in detail to the present embodiments of the disclosure, certain examples of which are illustrated in the accompanying drawings.

Embodiments of the present disclosure relate to computerized systems and methods for causing an action to be performed in response to an identified network communication. A "network communication," as used herein, may include any information or data communicated over a network in any form, such as in one or more packets. In some embodiments, a network communication may sent or received in a particular format so as to conform to a network protocol. Information or data in a network communication may be transmitted in an encoded and/or encrypted form, and it may be necessary to decode and/or decrypt the network communication in order to view the information or data. As used herein, network communications may also be referred to as network traffic. Moreover, as used herein, a network "connection" may refer to a situation where one or more network communications are sent between computing systems (e.g., client device(s) 110, blackhole system(s) 132, firewall(s) 134, DNS server(s) 136, proxy server(s) 138, malicious system(s) 150) that utilize a same or similar network protocol. A "network protocol" as used herein, may be any type of protocol used in network communications, including, but not limited to, Hypertext Transfer Protocol (HTTP), Internet Relay Chat (IRC), Secure Shell (SSH), malware protocols (e.g., poison ivy, zeus), or any other protocol for communicating over a network. A "malicious" network communication, as used herein, may refer to any network communication that was sent as a result of a request from a malware application (e.g., on a client device 110) or malicious system (e.g., a malicious system 150). An "attacker," as used herein, may refer to a user or automated process of a malicious system (e.g., a malicious system 150).

Embodiments of the present disclosure include systems and methods that may receive a first network communication, and cause an action to be performed based on the first network communication. For example, a first network communication may include a request for a connection to an IP address, and may use a particular protocol for enabling communication between an infected computer and an attacker's computer. In some embodiments disclosed herein, the protocol may be a protocol used by a malware application to communicate with malicious computer systems. Systems and methods disclosed herein may determine the protocol, and identify an action to be performed based on the protocol. For example, the action may include closing a malware application that initiated the request, uninstalling the malware application, or gathering information from the malware application. Once the protocol has been implemented, a second network communication can be sent to the infected computer to cause it to perform the action.

One or more advantages may be achieved by providing security applications on computers or networks. For example, certain software, such as anti-virus software, can remove known malware from computers. Certain network security applications, such as intrusion detection systems and firewalls, may block network communications with sources known to be malicious. However, known security technologies have limitations. For example, anti-virus software may remove instances of known malware, but typically requires that a user run and update the software on a regular basis for the software to be effective. Network security applications are generally limited to blocking malicious network communications, and do not remove malware from compromised systems. Known security technologies are also generally limited to removing or blocking certain instances of known malicious activity, and are not very effective in gathering information about the malicious activity. What is needed is a network-based solution that identifies and removes malicious software. What is also needed is a solution that gathers information about malicious activity, so that the information may be used to prevent new malicious attacks.

Embodiments of the present disclosure can address the limitations associated with known security technologies. For example, embodiments of the present disclosure provide computerized systems and methods that may intercept a network communication from a compromised computer, that may implement a protocol used in the first network communication to enable further communications with the compromised computer, and that may use the further communications to send instructions to the compromised computer to remediate malicious activity and/or gather additional information about malicious activity.

FIG. 1 is a block diagram of an example computing environment 100 for implementing embodiments of the present disclosure. The arrangement and number of components in system 100 is provided for purposes of illustration. Additional arrangements, number of components, and other modifications may be made, consistent with the present disclosure.

As shown in FIG. 1, computing environment 100 may include one or more client devices 110, networks 120, 140, blackhole systems 132, firewalls 134, DNS servers 136, proxy servers 138, and malicious systems 150. Client device(s) 110 may be coupled to malicious system(s) 150 via one or more networks 120, 140 and one or more blackhole systems 132, firewalls 134, DNS servers 136, and proxy servers 138.

By way of example, a client device 110 could be a personal computer, desktop computer, laptop computer, server, mobile computer, mobile phone, smart phone, tablet computer, netbook, electronic reader, personal digital assistant (PDA), wearable computer, smart watch, gaming device, set-top box, television, personal organizer, portable electronic device, smart appliance, navigation device, and/or other type of computing device. In some embodiments, a client device 110 may be implemented with hardware devices and/or software applications running thereon. A client device 110 may communicate with one or more computer systems (e.g., blackhole system(s) 132, firewall(s) 134, DNS server(s) 136, proxy server(s) 138, malicious system(s) 150) over one or more networks 120, 140. A client device 110 may store browser software that enables client device 110 to access resources on a network, such as the Internet. A client device 110 may also receive and store malware distributed over a network from one or more malicious systems 150. In some embodiments, one or more of client device(s) 110 may be implemented using a computer system, such as computer system 900 of FIG. 9.

Computing environment 100 may include one or more network(s) 120. In one embodiment, network(s) 120 may be one or more local networks (e.g., personal area networks (PANs), local area networks (LANs), metropolitan area networks (MANs)), though the disclosure is not so limited. Network(s) 120 may connect client device(s) 110 with one or more blackhole systems 132, firewalls 134, DNS servers 136, and proxy servers 138. Network(s) 120 may include one or more PANs, LANs, MANs, wide area networks (WANs), or any combination of these networks. Network(s) 120 may include a combination of a variety of different network types, including Ethernet, intranet, twisted-pair, coaxial cable, fiber optic, cellular, satellite, IEEE 802.11, terrestrial, Internet, and/or other types of wired or wireless networks.

Client device(s) 110 may be configured to communicate with one or more malicious systems 150 through one or more blackhole systems 132, firewalls 134, DNS servers 136, and/or proxy servers 138. A firewall 134 may be a network security solution for controlling incoming and outgoing network traffic based on pre-established rules. For example, a firewall 134 may determine whether or not to allow network communications based on a rule set. A firewall 134 may be any type of known firewall, and may exist as software, hardware, or a combination of software and hardware. In some embodiments, one or more of firewall(s) 134 may be implemented using a computer system, such as computer system 900 of FIG. 9.

A DNS server 136 may receive requests for domain names from client device(s) 110, and may be configured to translate or convert the domain names to numerical Internet protocol (IP) addresses. The IP addresses may be associated with computing devices that are connected over one of network(s) 120, 140. Once a DNS server 136 has obtained an IP address corresponding to a domain name, the DNS server may send a message including the IP address to the client device that requested the domain name. That client device 110 may then connect to the desired computing device over a network using the IP address. A DNS server 136 may be any type of known DNS server, and may exist as software, hardware, or a combination of software and hardware. In some embodiments, one or more of DNS server(s) 136 may be implemented using a computer system, such as computer system 900 of FIG. 9.

A proxy server 138 may act as an intermediary for requests from client device(s) 110 seeking resources from other computing devices on network(s) 120, 140. A proxy server may exist as software, hardware, or a combination of software and hardware. In some embodiments, one or more of proxy server(s) 138 may be implemented using a computer system, such as computer system 900 of FIG. 9.

Computing environment 100 may also include one or more blackhole system(s) 132. By way of example, blackhole system(s) 132 could include any combination of one or more servers, databases, mainframe computers, general-purpose computers, personal computers, or other types of computing devices. In some embodiments, one or more blackhole system(s) 132 may be configured to receive a network communication, and may cause an action to be performed based on the network communication. Blackhole system(s) 132 may store and/or retrieve network security information. In some embodiments, a blackhole system 132 may be a standalone computing system or apparatus, or it may be part of a larger system. For example, blackhole system(s) 132 may represent distributed servers that are remotely located and communicate over a communications network, or over a dedicated network, such as a LAN. Blackhole system(s) 132 may include one or more back-end servers for carrying out one or more aspects of the present disclosure.

A blackhole system 132 may be implemented as a server system comprising a plurality of servers, or a server farm comprising a load balancing system and a plurality of servers. In some embodiments, a blackhole system 132 may be implemented with hardware devices and/or software applications running thereon. A blackhole system 132 may communicate with client device(s) 110, firewall(s) 134, DNS server(s) 136, proxy server(s) 138, and/or malicious system(s) 150 over one or more networks 120, 140. In some embodiments, one or more of the computing devices in blackhole system(s) 132 may be implemented using a computer system, such as computer system 900 of FIG. 9.

Computing environment 100 may also include one or more network(s) 140. In one embodiment, network(s) 140 may be one or more WANs, such as the Internet, though the disclosure is not so limited. Network(s) 140 may connect malicious system(s) 150 with one or more blackhole systems 132, firewalls 134, DNS servers 136, and proxy servers 138. Network(s) 140 may include one or more PANs, LANs, MANs, WANs, or any combination of these networks. Network(s) 140 may include a combination of a variety of different network types, including Ethernet, intranet, twisted-pair, coaxial cable, fiber optic, cellular, satellite, IEEE 802.11, terrestrial, Internet, and/or other types of wired or wireless networks.

Computing environment 100 may further include one or more malicious systems 150. By way of example, a malicious system 150 could include any combination of one or more personal computers, desktop computers, laptop computers, servers, mobile computers, mobile phones, smart phones, tablet computers, netbooks, electronic readers, personal digital assistants (PDAs), wearable computers, smart watches, gaming devices, set-top boxes, televisions, personal organizers, portable electronic devices, smart appliances, navigation devices, and/or other types of computing devices. In some embodiments, a malicious system 150 may be implemented with hardware devices and/or software applications running thereon. An individual, such as an attacker, may use a malicious system 150 to communicate with one or more computer systems (e.g., blackhole system(s) 132, firewall(s) 134, DNS server(s) 136, proxy server(s) 138, client device(s) 110) over one or more networks 120, 140. In some embodiments, an individual may use a malicious system 150 to distribute malware or to communicate with a client device 110 infected with malware.

In some embodiments, a malicious system 150 may include a server, such as a command and control server, over which a computing device of an attacker communicates with an infected client device 110. A command and control server may be connected to the attacker's computing device over one or more networks, such as any one or more of the types of networks described above with reference to network(s) 120, 140. The command and control server may provide for communication with an infected client device 110 via a command and control channel, and may allow an attacker's computing device to remain concealed from an infected client device 110. In some embodiments, one or more of the computing devices in malicious system(s) 150 may be implemented using a computer system, such as computer system 900 of FIG. 9.

Although computing environment 100 of FIG. 1 illustrates separate blackhole system(s) 132, firewall(s) 134, DNS server(s) 136, and proxy server(s) 138, the disclosure is not so limited. Any of blackhole system(s) 132, firewall(s) 134, DNS server(s) 136, and proxy server(s) 138 could be implemented together on the same computer system, such as on a computer system 900 of FIG. 9. As one example, blackhole system(s) 132, firewall(s) 134, DNS server(s) 136, and proxy server(s) 138 could all exist on the same computer system, such as on a computer system 900 of FIG. 9. Moreover, in some embodiments, computing environment 100 may not include one or more of firewall(s) 134, DNS server(s) 136, and proxy server(s) 138.

Although computing environment 100 of FIG. 1 illustrates separate local network(s) 120 and wide area network(s) 140, the disclosure is not so limited. Embodiments of the present disclosure may be implemented in computing environments utilizing only local network(s) 120 or wide area network(s) 140.

In accordance with embodiments of the present disclosure, blackhole system(s) 132 may store security information, and may use the stored security information to redirect certain network communications to blackhole system(s) 132. This may be referred to as "black-holing" the network communications. The security information may include information or algorithms for identifying certain types of network communications, such as suspicious network communications. For example, the security information may include lists of IP addresses or domain names that are known to be associated with good or bad sources. This may include, for example, blacklist, whitelist, or greylist information, rating information (e.g., scores associated with IP addresses or domain names), or any other known type of security information. The security information may include information that is received by blackhole system(s) 132 over one or more networks from one or more known providers of network security information. Blackhole system(s) may receive updates containing new security information from these providers on a periodic basis. In some embodiments, blackhole system(s) 132 may include one or more processes or application programming interfaces (APIs) for directing communications to bad domains to instead connect to blackhole server(s) 132.

Blackhole system(s) 132 may transmit any portion of the security information to one or more DNS server(s) 136. Blackhole system(s) 132 may also transmit one or more software programs, such as a script, to DNS server(s) 136. The software program(s) may cause DNS server(s) 136 to analyze data in received network communications, and to direct network communications meeting certain criteria based on the analysis to blackhole system(s) 132. In some embodiments, this analysis may involve a comparison. For example, the security information may include a list of domain names known to be associated with malicious sources, and the software program(s) may direct a DNS server to compare the domain names in the list with domain names included in network communications received by the DNS server. If the domain name in a network communication matches a domain name in the list, the DNS server may direct the network communication to blackhole system(s) 132. In some embodiments, the DNS server may also compare the IP address to which the domain name resolves against a list of known bad IP addresses, and may direct the request to blackhole system(s) 132 if the IP addresses matches an IP address in the list. In some embodiments, security information and/or software programs received from sources other than blackhole system(s) 132 may be utilized, instead of or in addition to program(s) and/or security information received from blackhole system(s) 132, by DNS server(s) 136 to perform the analysis of network communications.

In some embodiments, domain names in network communications that do not meet certain criteria based on the analysis will resolve to the IP address to which it would normally resolve, even if that IP address were associated with a malicious system 150. As a result, the client computer requesting the domain name may connect to the malicious system 150 using the returned IP address.

In some embodiments, a DNS server 136 may direct the identified network communications to blackhole system(s) 132 by resolving the domain name to an IP address associated with blackhole system(s) 132. That is, when a DNS server 136 identifies a network communication that should be directed to blackhole system(s) 132, it may resolve the domain name to an IP address associated with blackhole system(s) 132, rather than the IP address to which it would normally resolve. The IP address associated with blackhole system(s) 132 may then be returned in a message to the client device that sent the request. The client device may then send a network communication requesting connection to the IP address, which would result in the client device connecting to blackhole system(s) 132. As a result, the client computer, and the malware that initiated the request, may be unaware that the client computer is connecting to blackhole system(s) 132, rather than the malicious system 150 associated with the domain name requested by the client computer. Once blackhole system(s) 132 has received the network communication from the client computer, it can perform a number of different actions based on the network communication. For example, blackhole system(s) 132 may cause one or more actions to be performed in response to the network communication, as further described below with respect to FIG. 3. As another example, blackhole system(s) 132 may cause the connection from the client device to be blocked. As still another example, blackhole system(s) 132 may log Hypertext Transfer Protocol (HTTP) messages from the client device, and save them for analysis.

In some embodiments, identified network communications may be directed to blackhole system(s) 132 by using IP routing entries, or internal routing protocols. Internal routing protocols may add records of known malicious system(s) 150 to their routing tables, redirecting client computer system(s) 110 to blackhole system(s) 132 instead of the normal route on a network, such as network(s) 120, 140. These communications may be treated the same by blackhole system(s) 132 as in previous descriptions above.

In some embodiments, blackhole system(s) 132 may utilize DNS Response Policy Zones (DNS RPZ) to direct identified network communications to blackhole system(s) 132. DNS RPZ may be used to provide customized handling of the resolution of collections of domain names. For example, DNS RPZ may be used by a DNS server to block a network communication to a domain name, or to direct a network communication to a different domain name, sometimes referred to as a CNAME, such as a domain name associated with blackhole system(s) 132. Blackhole server(s) 132 could send zone information to DNS server(s) 136, which may instruct DNS server(s) 136 to direct certain network communications to blackhole system(s) 132. DNS RPZ may also provide DNS servers with the ability to receive reputational data from outside sources, such as the security information that may be transmitted from blackhole system(s) 132. DNS server(s) 136 may determine how to resolve domain resolution requests based on this data.

In some embodiments, blackhole system(s) 132 may provide for capture of full packets of encrypted and raw network communications. This may allow for the capture of all of the traffic blackhole system(s) 132 receive, and may allow blackhole system(s) 132 to move the traffic in near-real-time to other analysis systems. This may allow blackhole system(s) 132 to quickly determine the severity of a compromise and other adversary indicators. Blackhole system(s) 132 may also collect encrypted packets and log them in a standard format for post processing. Blackhole system(s) 132 may also store decrypted packets from sessions where a successful key exchange happened with a victim. Blackhole system(s) 132 may store decrypted packets in a modified format that is sufficient for post processing and reconstruction. Storage of decrypted packets may be advantageous to analysis of the packets, as all of the commands issued in the Command and Control channel by the adversary may be visible and may not require post processing, such as decompression or decryption.

Figure 2:
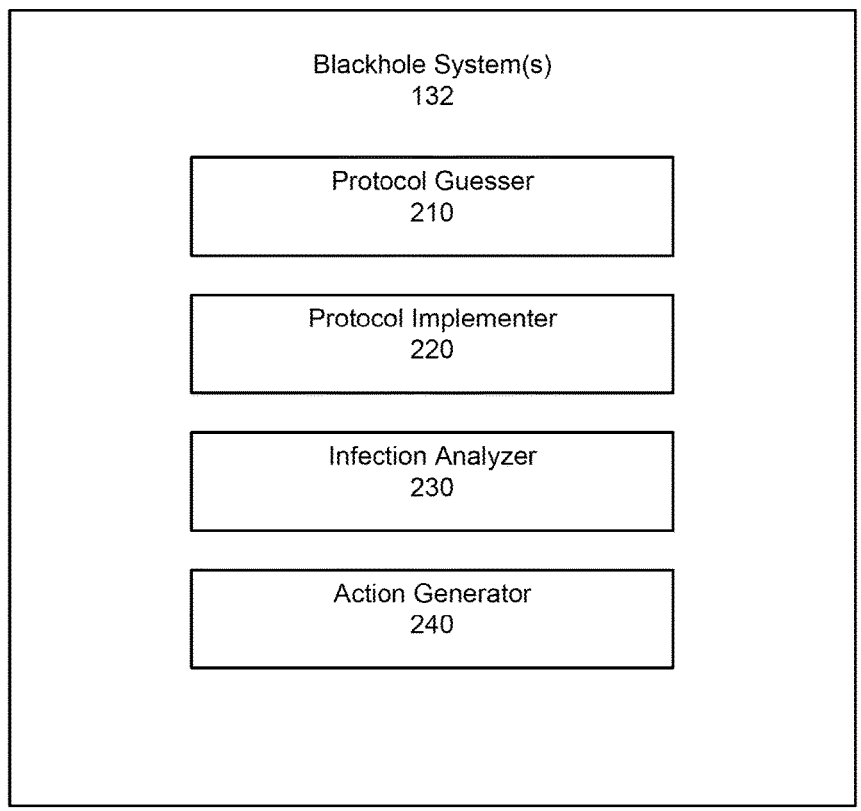
FIG. 2 illustrates a diagram of an example computing environment of a blackhole system, consistent with embodiments of the present disclosure.

FIG. 2 is a block diagram of an example computing environment 200 of a blackhole server 132, consistent with embodiments of the present disclosure. The arrangement and number of components in computing environment 200 is provided for purposes of illustration. Additional arrangements, number of components, and other modifications may be made, consistent with the present disclosure.

As shown in FIG. 2, a blackhole system 132 may include modules, including one or more protocol guesser(s) 210, protocol implementer(s) 220, infection analyzer(s) 230, and action generator(s) 240. The modules may be implemented in software, hardware, or a combination of software and hardware.

Protocol guesser 210 may include logic and/or componentry for identifying a protocol in a received network communication. In some embodiments, protocol guesser 210 may try to maintain the connection with the client computer that sent the network communication. To do so, protocol guesser 210 will try connecting with the client computer using a variety of different protocols until a particular protocol is successful.

Protocol guesser 210 may include logic or componentry to accept network communications using a variety of different protocols on a variety of ports, such as on all protocols and ports of which blackhole system(s) 132 is aware. In some embodiments, protocol guesser 210 may route network communications from all ports to a protocol guessing subsystem. A port, as used herein, may be a construct serving as a communications endpoint for specific applications (e.g., a malware application) or processes in a computing device's operating system. By routing network communications using all protocols and all ports to a single protocol guesser 210, this may allow for interpreting a malicious network communication regardless of the port it is utilizing. For example, HTTP is a protocol that may typically communicate over port 80. Even if malware communicates over HTTP on port 9000, protocol guesser 210 may receive the traffic and attempt to guess the protocol. Protocol guesser 210 will be further described below with respect to FIGS. 3-5.

Protocol implementer 220 may include logic and/or componentry for implementing an identified protocol. For example, once a protocol and/or key has been guessed, protocol implementer 220 may cause the communication channel with the client device to be maintained. To do so, protocol implementer 220 may route the network communications to a protocol subsystem configured to communicate using the protocol, and the protocol subsystem may maintain the connection to the client device. Protocol implementer 220 will be further described below with respect to FIGS. 3 and 6.

Infection analyzer 230 may include logic and/or componentry for analyzing the network communication, including the identified protocol. Infection analyzer 230 may provide information about the identified protocol for display to a user, such as a security analyst, for example. Infection analyzer 230 will be further described below with respect to FIGS. 3, 7, and 8.

Action generator 240 may include logic and/or componentry for causing an action to be performed in response to information in received network communications, such as the identified protocol. For example, once certain information about a communication associated with malicious activity has been identified, certain actions may be performed to prevent future malicious activity. The actions may be selected automatically, or by a user of the blackhole system 132, such as a security analyst. The actions may include, for example, uninstalling the malware, closing the malware, gathering information about the malware, gathering information about the compromised client device, etc. Action generator 240 will be further described below with respect to FIG. 3.

Figure 3:
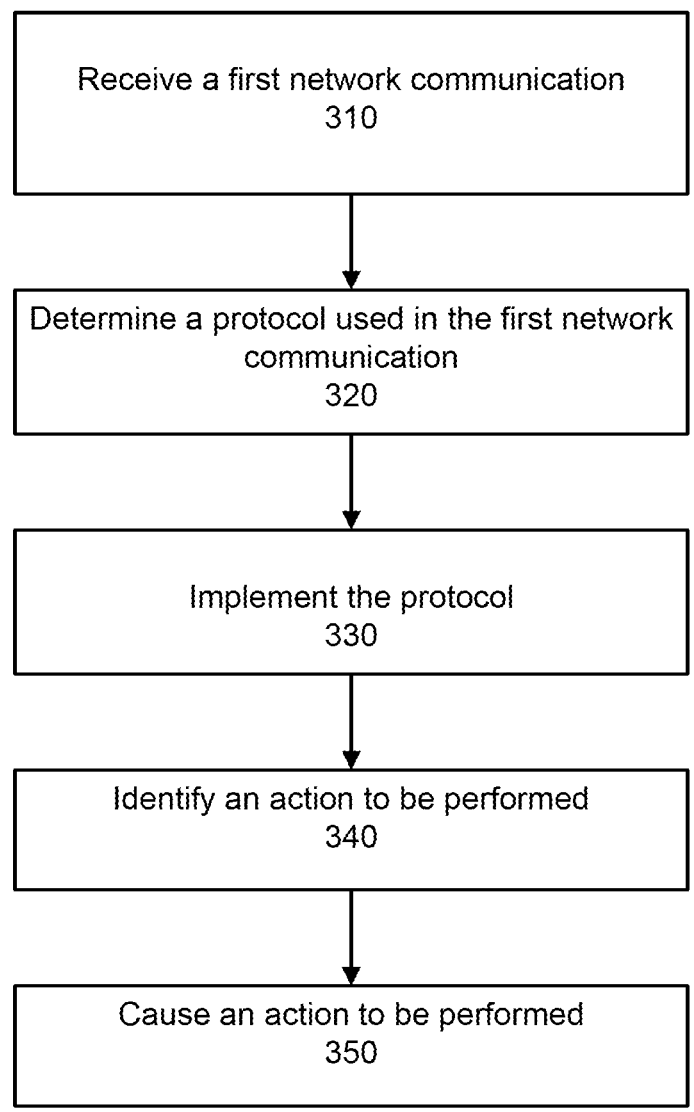
FIG. 3 illustrates a flowchart of an example method for causing an action to be performed in response to a received network communication, consistent with embodiments of the present disclosure.

FIG. 3 illustrates a flowchart of an example method 300, consistent with embodiments of the present disclosure. Example method 300 may be implemented in a computing environment (see, e.g., FIG. 1) using one or more computer systems (see, e.g., FIG. 9). In some embodiments, method 300 may be performed by one or more blackhole systems 132.

In step 310, a first network communication may be received. The first network communication may be received from a client device 110, such as a compromised client device, for example. In some embodiments, malware on a client device 110 may have caused client device 110 to request DNS resolution of a domain name associated with a malicious system 150. The DNS server may have identified the domain name as being malicious, and sent client device 110 the IP address of a blackhole system 132, rather than the IP address of the malicious system. The client device may then send a first network communication to blackhole system 132 when it attempts to connect to the IP address, and the first network communication may then be received by the blackhole system 132.

In step 320, a protocol used in the first network communication may be determined. Step 320 may be performed, for example, by a protocol guesser, such as protocol guesser 210 of FIG. 2. The protocol may be determined, for example, using characteristics of protocols, cryptography, and compression. This may be accomplished through pattern matching and real-time interaction with a client device infected by malware. In some embodiments, the protocol may be determined by trying to respond to a client device's 110 first network communication using a particular protocol. For certain protocols, the network communication may be encrypted with a key. For such protocols, protocol guesser may try to respond to a client device's 110 first network communication using the particular protocol and a key. In some embodiments, protocols and/or keys may be determined by using a method, such as method 400 of FIG. 4, and/or method 500 of FIG. 5. Methods 400 and/or 500 may provide a robust mechanism for guessing malware protocols with high certainty.

Figure 4:
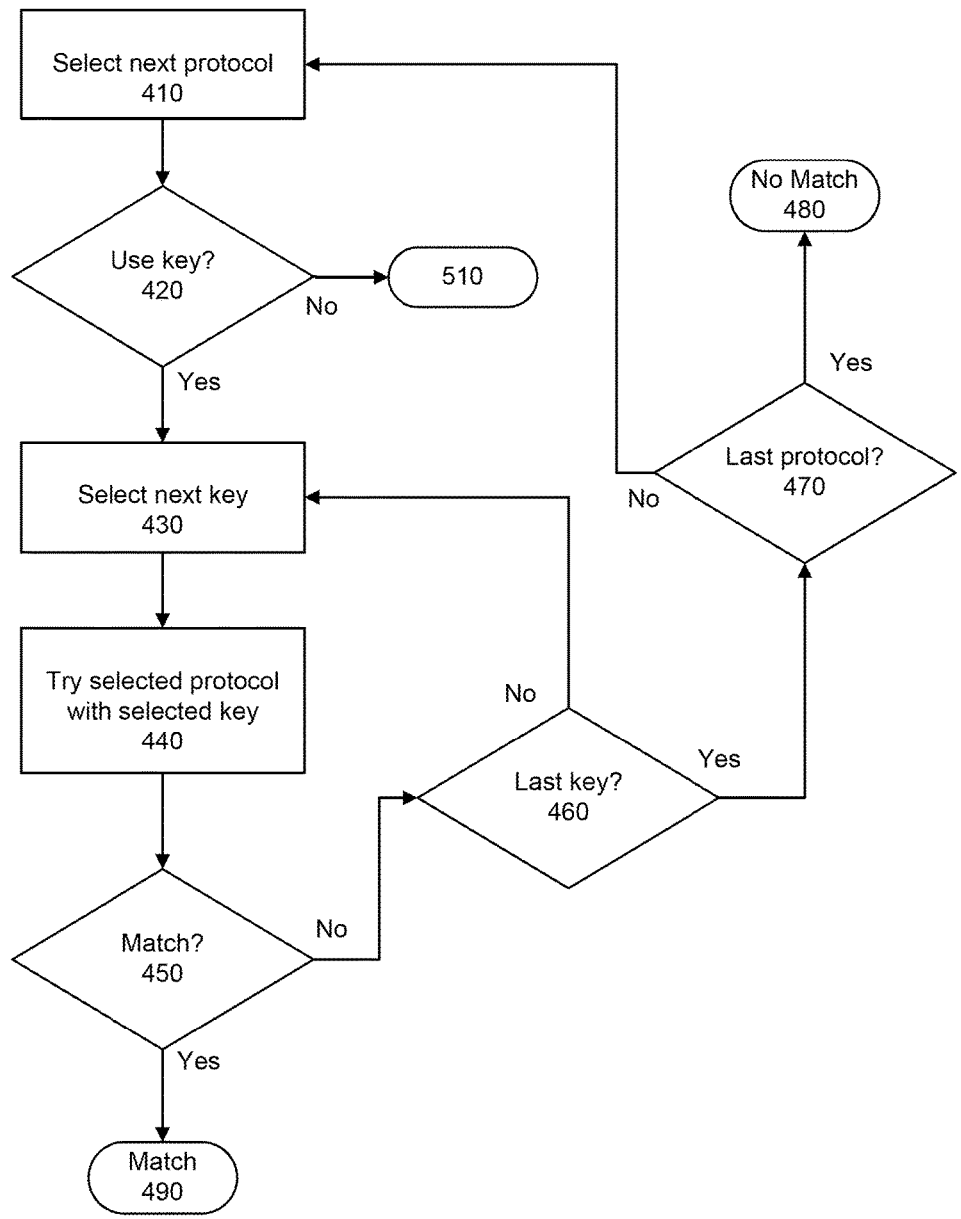
FIG. 4 illustrates a flowchart of an example method for guessing a protocol, consistent with embodiments of the present disclosure.

FIG. 4 illustrates a flowchart of an example method 400 for guessing a protocol, consistent with embodiments of the present disclosure. Example method 400 may be implemented in a computing environment (see, e.g., FIG. 1) using one or more computer systems (see, e.g., FIG. 9). In some embodiments, method 400 may be performed by one or more blackhole systems 132, such as a protocol guesser 210 of blackhole system(s) 132.

In step 410, method 400 may select a particular protocol with which to try responding to the first network communication. In step 420, method 400 may determine whether the selected protocol may use a key. This may be determined, for example, by checking attributes stored about the particular protocol in blackhole system(s) 132. If the protocol may use a key, then method 400 may proceed to step 430. If the selected protocol may not use a key, method 400 may proceed to step 510 of method 500 of FIG. 5, which is further discussed below. In step 430, method 400 may select a key with which to try responding to the first network communication using the protocol. In step 440, method 400 may cause a response to the first network communication to be sent to the client device from blackhole system(s) 132 using the selected protocol and the selected key. In step 450, method 400 may determine whether the selected protocol and key were correct. This may be determined, for example, by whether a response, such as a certain type of message, is received from the client device. If a response from the client indicates that a connection has been established, method 400 may determine in step 450 that there was a match, and that the selected protocol and key were correct. If there was a match, method 400 may proceed to step 490. If the client repeats the first network communication, or sends another request for connection, method 400 may determine in step 450 that there was not a match, and that the selected protocol and key were incorrect. If there was not a match, method 400 may proceed to step 460.

In step 460, method 400 may determine whether the selected key was the last key to try in a list of keys. If it was not, method 400 may proceed to back to step 430. By proceeding back to step 430, a next key may be selected from the list of keys, and method 400 may try the selected protocol with that next key. If the selected protocol doesn't work for any of the keys, method 400 may proceed to step 470. In step 470, method 400 may determine whether the selected protocol was the last protocol to try in a list of protocols. If it was not, method 400 may proceed back to step 410. By proceeding back to step 410, a next protocol (e.g., second protocol) may be selected from the list of protocols, and may be tried (e.g., a response may be sent to the client device using the second protocol, and a determination may be made on whether a connection was established based on a response back from the client device. In some embodiments, blackhole system(s) 132 may have to wait for the client device to again attempt to connect with blackhole server(s) 132, such as by receiving another network communication from the client device, before attempting to send a response utilizing a new protocol. If in step 470 it is determined that the selected protocol was the last protocol in a list of protocols, method 400 may proceed to step 480, which may indicate that method 400 was unable to negotiate a successful connection with the client device.

Figure 5:
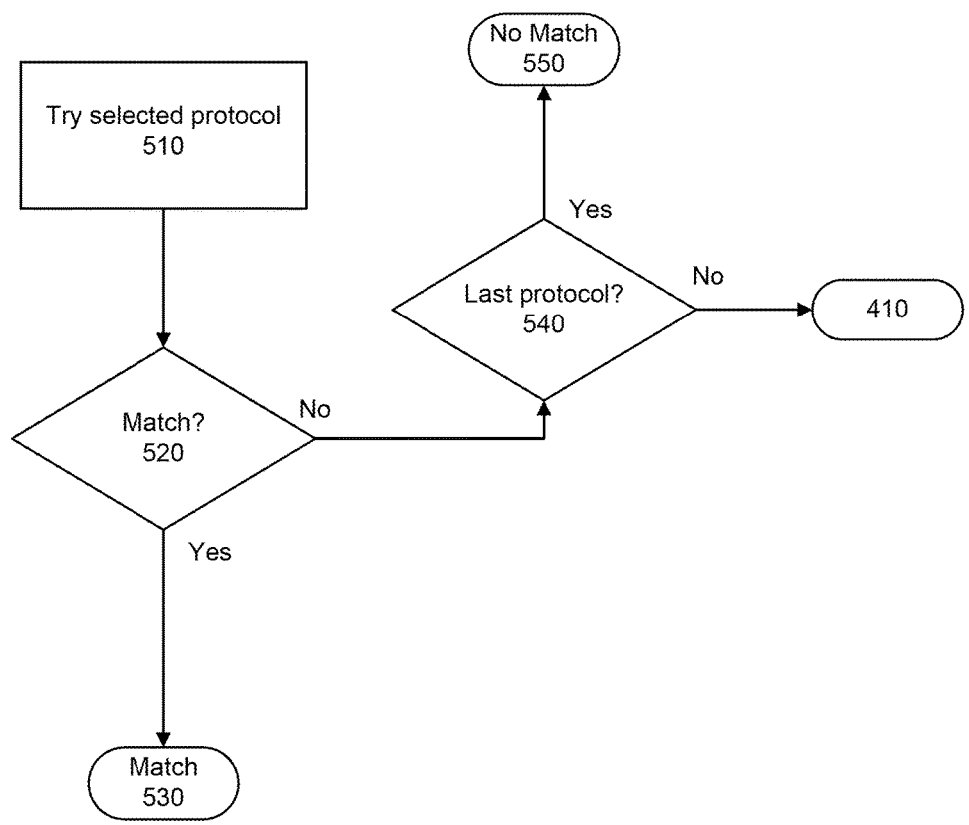
FIG. 5 illustrates a flowchart of another example method for guessing a protocol, consistent with embodiments of the present disclosure.

FIG. 5 illustrates a flowchart of another example method 500 for guessing a protocol, consistent with embodiments of the present disclosure. Example method 500 may be implemented in a computing environment (see, e.g., FIG. 1) using one or more computer systems (see, e.g., FIG. 9). In some embodiments, method 500 may be performed by one or more blackhole systems 132, such as by a protocol guesser 210 of blackhole system(s) 132.

As noted previously, if in step 420 of method 400 it is determined that a selected protocol does not utilize a key, method 400 may proceed to step 510 of method 500. In step 510, method 500 may cause a response to the first network communication to be sent to the client device from blackhole system(s) 132 using the selected protocol. In step 520, method 500 may determine whether the selected protocol was correct. This may be determined, for example, by whether a response, such as a certain type of message, is received from the client device. If a response from the client indicates that a connection has been established, method 500 may determine in step 520 that there was a match, and that the selected protocol was correct. If there was a match, method 500 may proceed to step 530. If the client repeats the first network communication, or sends another request for connection, method 500 may determine in step 520 that there was not a match, and that the selected protocol was incorrect. If there was not a match, method 500 may proceed to step 540. In step 540, method 500 may determine whether the selected protocol was the last protocol to try in a list of protocols. If it was not, method 500 may proceed back to step 410. By proceeding back to step 410, a next protocol may be selected from the list of protocols, and method 400 may try the next protocol. If in step 540 it is determined that the selected protocol was the last protocol in a list of protocols, method 500 may proceed to step 550, which may indicate that method 500 was unable to negotiate a successful connection with the client device.

Although method 400 of FIG. 4, and method 500 of FIG. 5, illustrate iterating through all of the protocols and, when applicable, all of the keys, before trying to match another protocol, the disclosure is not so limited. Protocol guesser 210 may instead select a key, and then iterate through all the protocols using that key before attempting the next protocol. Moreover, the different protocols and/or keys may be tried in parallel, rather than trying them in the linear order illustrated in FIGS. 4 and 5. Finally, any ordering of trying protocols and/or keys may be utilized, the disclosure not being limited to the example order set forth in FIGS. 4 and 5.

In some embodiments, a protocol guesser, such as protocol guesser 210 of FIG. 2, may store known patterns, heuristics, and/or encryption/decryption keys associated with certain protocols. Patterns and/or heuristics of particular protocols may be known, for example, based on known structures of the protocols, such as those outlined in protocol requests for comments (RFCs). Similarly, certain keys may be known to be used in malware. These keys may be known from malware analysis performed by blackhole server(s) 132, or from malware analysis performed by one or more other security service providers. In trying to connect to a client computer 110 (e.g., in step 440 of method 400), protocol guesser 210 can use the known patterns, heuristics, and/or keys to generate a response to the first network communication in accordance with a certain protocol.

In some embodiments, protocols and keys may be tried in a certain order based on those that are most likely to be successful. For example, a protocol guesser, such as protocol guesser 210 of FIG. 2 may select a protocol and/or key to try, such as in steps 410 and 430 of method 400, based on known patterns, heuristics, or encryption schemes of certain protocols. In some embodiments, information may be extracted from the first network communication from a client device 110 and analyzed in order to positively identify the type of malware in use. If the information corresponds to an expected protocol based on the known patterns, heuristics, or encryption schemes, selection of that protocol may be prioritized (e.g., tried first). In some embodiments, a particular protocol may include a key in the network communication received by blackhole system(s) 132. For such protocols, blackhole system(s) 132 may be able to extract the key from the network communication and use it in the response communication to the client device.

Once a particular protocol and key have been correctly guessed, method 400 may proceed to step 490, or method 500 may proceed to step 530, and method 300 may proceed to step 330. In step 330, the protocol may be implemented. Step 330 may be performed, for example, by a protocol implementer, such as protocol implementer 220 of FIG. 2. The protocol may be implemented by, for example, redirecting the connection with the client device to a subsystem of blackhole system(s) 132 implementing that protocol, such as one of the subsystems illustrated in FIG. 6. The subsystem implementing the protocol may then be responsible for maintaining the connection, such as through communication of commands (e.g., keep-alive commands) to the malware on the client device. With the protocol implemented, one or more second network communications are enabled so that blackhole system(s) can communicate with the malware on the client device. That is, by implementing the protocol, blackhole system(s) 132 emulate the malicious system, and can thus control the malware on the compromised client device and initiate actions through the malware as a malicious system, such as a malicious system 150, would. That is, once the connection has been established, any number of network communications may be sent between the client device and blackhole system(s) 132, and blackhole system(s) 132 may send any number of commands to control the client device to perform certain actions.

Figure 6:
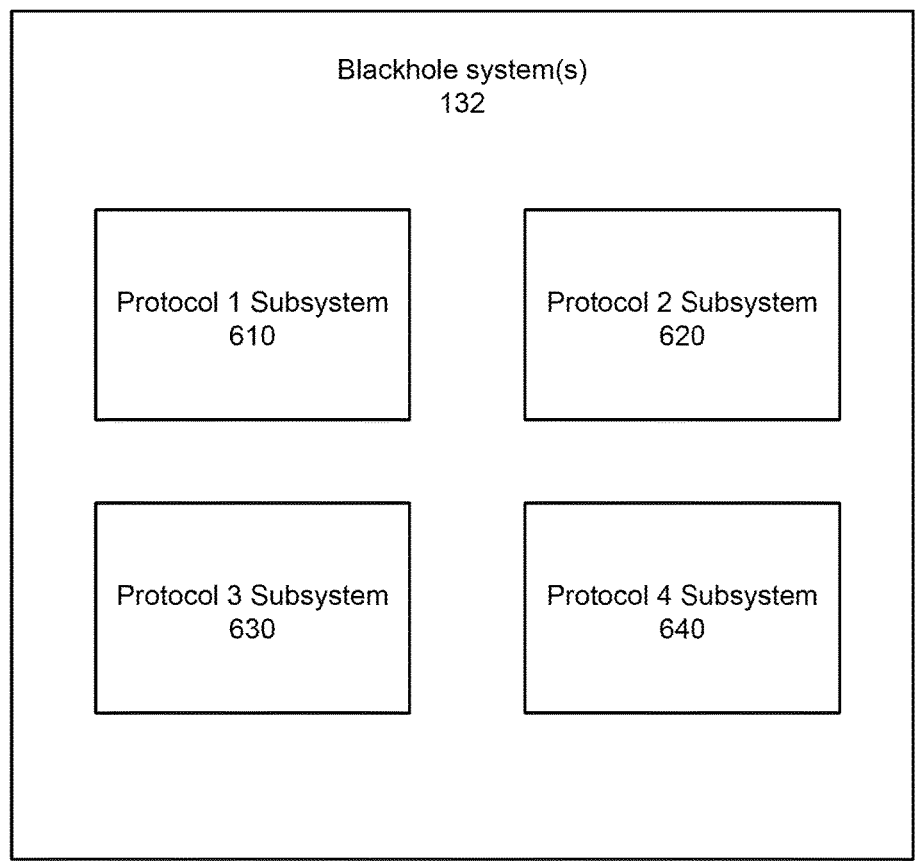
FIG. 6 illustrates a diagram of an example configuration of a blackhole system, consistent with embodiments of the present disclosure.

FIG. 6 illustrates a block diagram of an example configuration 600 of blackhole system(s) 132. Blackhole system(s) 132 may include a plurality of subsystems configured for implementing communications over certain protocols. In some embodiments, blackhole system(s) 132 may have a subsystem for each protocol that may be guessed by protocol guesser 210. When a protocol of a first network communication has been successfully determined in step 320, future network communications from the client device using that protocol may be directed to a subsystem corresponding to that protocol. For example, if the determined protocol is protocol 1, the network communications may be directed to protocol 1 subsystem 610 to maintain the connection. Likewise, a determined protocol 2 network communication may be directed to protocol 2 subsystem 620, a determined protocol 3 network communication may be directed to protocol 3 subsystem 630, and a determined protocol 4 network communication may be directed to protocol 4 subsystem 640. Although four different protocol subsystems are illustrated in FIG. 6, the disclosure is not so limited. Any number of protocol subsystems may be implemented in blackhole system(s) 132. The protocol subsystems may be implemented in software, hardware, or any combination of software and hardware.

In step 340, an action to be performed may be identified. Step 340 may be performed, for example, by an infection analyzer, such as infection analyzer 230 of FIG. 2. In some embodiments, a plurality of actions to be performed may be identified. The actions may be included, for example, in a listing of possible actions to perform. In some embodiments, at least some of the actions may be actions for the client computer to perform, such as closing a malware application, uninstalling a malware application, or closing a malware-initiated network connection. For example, some malware contains commands to remove itself from a victim computer, or close itself on a client computer. If the malware supports these commands, an action may cause the malware to remove itself or to close itself, thus leaving the victim computer in a safer state until incident responders can perform more detailed analysis/remediation. In some embodiments, an action may cause blackhole system(s) 132 to quarantine the infected client device on the network, such as by restricting or ending its network connectivity until incident responders can get to the infected client device.

Some of the actions may direct the client computer to gather information, such as information about the malware, about the client computer, about a network connection, etc. For example, malware toolsets may include settings that can reveal details about the attacker and/or developer of the malware, and the settings with which the attacker and/or developer chose to configure the toolset (e.g., keyboard and language settings, timezones, etc.). This information can be useful in tracking down the attacker and/or developer. For example, the information can be used to fingerprint the adversary through a set of heuristics. These heuristics may include, for example, string matches for key strings in the information (e.g., keyboard type, camera models) in addition to other information about the adversary, such as re-use of User IDs and/or passwords to uniquely identify the human or team initiating the malicious actions.

Information about the malware that may be gathered may also include one or more keys stored in the malware, a username and/or password of the attacker or developer of the malware, an IP address and/or domain name of the attacker, etc. Information about the client computer may include, for example, a current user, an IP address of the client computer, a hostname of the client computer, a username of the client computer, a media access control (MAC) address of the client computer, hardware and/or software configuration details about the client computer (e.g., an operating system used by the client computer), security software installed on the client computer, an install path of the client computer, etc. Once information has been gathered by a client device 110, it may be communicated to blackhole system(s) 132 by, for example, sending a third network communication including the information to blackhole system(s) 132.

In some embodiments, an action may allow a connection with the malicious system 150 to which it initially tried to connect. For example, blackhole system(s) 132 may determine that malware using certain protocols may be allowed to be connected to malicious system(s) 150. In order to allow the connection, blackhole system(s) 132 may look up the hostname of the malicious system 150 to which the client device tried to connect, such as by requesting resolution from a DNS server (e.g., one of DNS server(s) 136). Blackhole system(s) 132 may then establish a connection with the malicious system 150, and blackhole system(s) 150 may intercept the command and control channel between the client device and the malicious system. In doing so, blackhole system(s) 132 may decode and log data in the command and control data. Actions may also determine which commands are allowed to reach a compromised client device 110 over such the command and control channel. If no commands are allowed, blackhole system(s) 132 may indicate an error in the command and control channel to the compromised client device 110. If commands are allowed, the allowed commands may be re-encoded and transmitted in the already established command and control channel with the compromised client device 110.

In some embodiments, one or more actions may be automatically identified. For example, an instruction to perform an action to gather information about the client computer may be automatically sent to the client computer. This may allow for rapid identification of the victim, and may shorten the time it takes to respond to an incident. It also automates steps that would normally be included in an incident response process, thereby reducing workload. In some embodiments, certain protocols may be associated with certain actions, so that when a particular protocol is determined, the associated actions are automatically identified. In other embodiments, a user, such as a security analyst, may view information about the network communication, including the protocol used in the network communication, and may identify one or more actions he/she wishes to have performed.

In step 350, method 300 may cause one or more actions, such as the actions identified in step 340, to be performed. Step 350 may be performed, for example, by an action generator, such as action generator 240 of FIG. 2. Step 350 may be performed, for example, by sending an instruction to perform the one or more actions in a network communication, such as a second network communication, to the client device. The instruction may cause the malware on the client device to perform the one or more actions. In some embodiments, the malware application may have been closed, or a network connection to the client device may have been disconnected. In such a case, blackhole system(s) 132 may queue the instruction, and may send the instruction once the client device and/or malware application reconnects to blackhole system(s) 132.

FIG. 7 illustrates an example screen 700 of a user interface for viewing infections, consistent with embodiments of the present disclosure. Screen 700 may be generated, for example, by an infection analyzer 230 of blackhole system(s) 132. Screen 700 may include, for example links to different viewing options from which a user, such as a security analyst, may select (e.g., using an I/O device 930, such as those described with respect to FIG. 9 below). Selection of the links may take the user to different screens of the user interface for viewing different types of information. The links may include, for example, a link 710 to a Domains view, a link 720 to a Protocols view, a link 730 to an Infections view, and/or a link 740 to a Connections view. The Domains view (not shown), may include a list of the domains that have been routed to blackhole system(s) 132, along with information about those domains. The Protocols view (not shown), may include a list of the protocols that have been routed to blackhole system(s) 132, along with information about those protocols. The Infections view, an example of which is shown in screen 700 of FIG. 7, may include text 760 indicating that the screen 700 being displayed is the Infections view, along with a chart listing various information about known infections (e.g., connections directed to certain domain or IP addresses that are known to be malicious). As shown in screen 700 of FIG. 7, the information for an infection may include, for example, a name of a domain associated with the infection (e.g., Example 1.com); a port (e.g., 80) used by the connection; a protocol (e.g., HTTP) used by the connection; an address, such as an IP address (e.g., 11.111.111.11), domain name, hostname, or username, of the compromised computer; an indication of a time that the connection was first received by blackhole system(s) 132 (e.g., 4 days, 6 hours ago); an indication of a time that the connection was last received by blackhole system(s) 132 (e.g., 4 days, 6 hours ago); a status of the infection (e.g., not resolved, not connected); and a link (e.g., View Infection) that may be selected by the user (e.g., using one of the devices connected to I/O 930 described with respect to FIG. 9 below) to view additional information about the infection. Screen 700 of FIG. 7 may also include an indication 750 of a user (e.g., User1) that is currently logged into blackhole system(s) 132.

Figure 8:
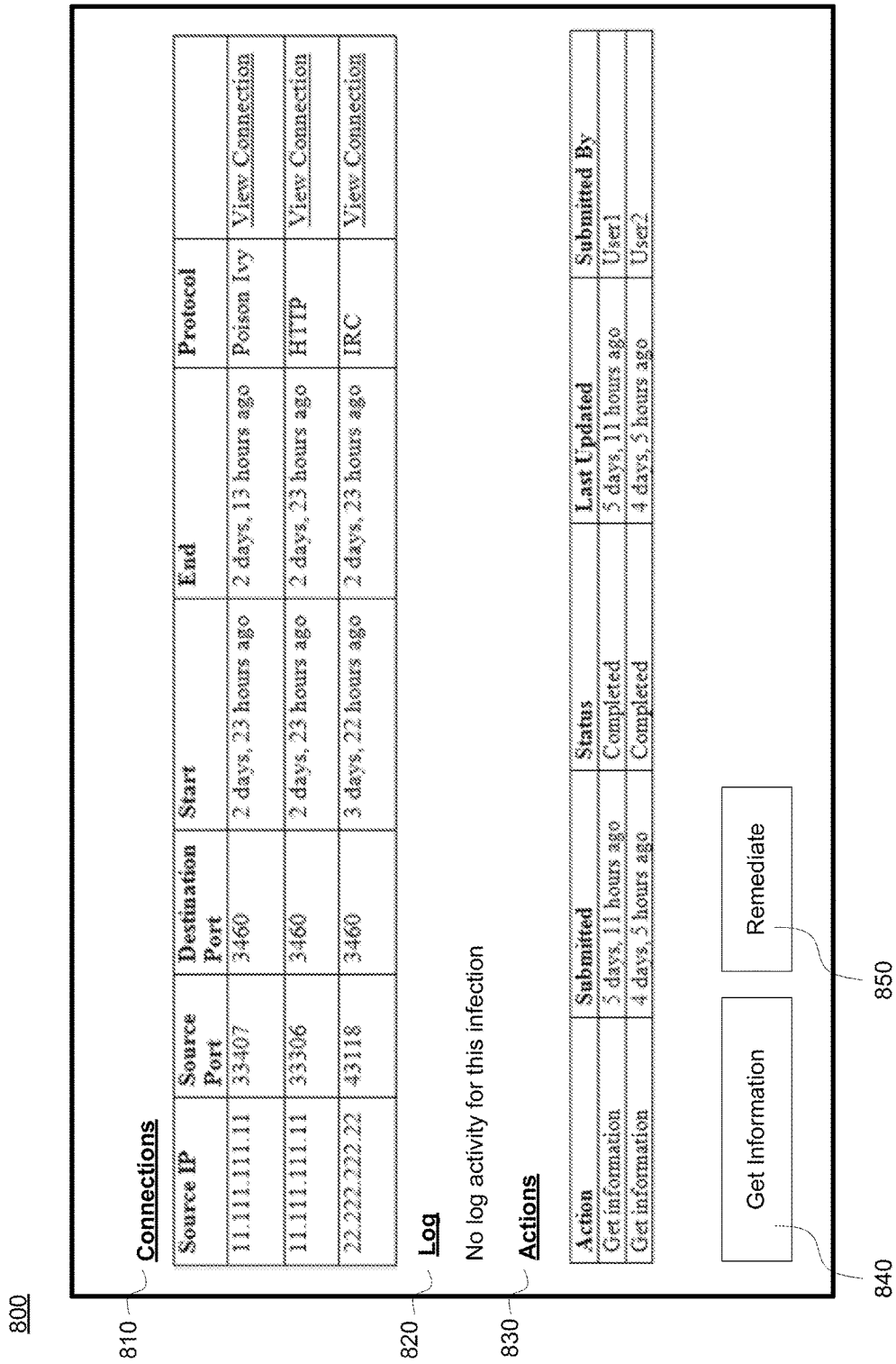
FIG. 8 illustrates an example screen of a user interface for viewing connections, consistent with embodiments of the present disclosure.

FIG. 8 illustrates an example screen 800 of a user interface for viewing connections. Screen 800 may be generated, for example, by an infection analyzer 230 of blackhole system(s) 132. A screen for viewing connections, such as screen 800, may be displayed when a user of the user interface selects a link, such as link 740 of screen 700. Screen 800 may display, for example, a list of the connections that have been received by blackhole system(s) 132. Screen 800 may include text 810 indicating that screen 800 displays connections, along with a chart listing various information about known connections. As shown in screen 800, the information for a connection may include, for example, an IP address (e.g., 11.111.111.11) of a source (e.g., a malicious system 150); a port (e.g., 33407) of a source; a port (e.g., 3460) of a destination (e.g., a compromised system, such as a client device 110); an indication of a time at which the connection started (e.g., 2 days, 23 hours ago); an indication of a time at which the connection ended (e.g., 2 days, 13 hours ago); an indication of a protocol used by the connection (e.g., Poison Ivy); and a link (e.g., View Connection) that may be selected by the user (e.g., using one of the devices connected to I/O 930 described with respect to FIG. 9 below) to view additional information about the connection.

Screen 800 may also include, for example, text 820 indicating that screen 800 displays a log of activities for an infection (e.g., no log activity for this infection). Screen 830 may also include, for example, text 830 indicating that screen 800 displays actions that blackhole system(s) 132 has performed for the listed connections, along with information about the actions. Information for an action that has been performed may include, for example, the type of action (e.g., get information); an indication of a time at which the action was submitted (e.g., 5 days, 11 hours ago); an indication of the status (e.g., completed) of the action; an indication of a time at which the action was last updated (e.g., 5 days, 11 hours ago); and an indication of a user who submitted the action (e.g., User1). Screen 800 may also include one or more icons (e.g., get information icon 840 and remediate icon 850) that may allow a user to initiate an action for a connection. For example, get information icon 840 may be selected by the user (e.g., using one of the devices connected to I/O 930 described with respect to FIG. 9 below) to initiate an action to gather information about the connection, such as information about a compromised client device 110 utilizing the connection. As another example, remediate icon 850 may selected by the user (e.g., using one of the devices connected to I/O 930 described with respect to FIG. 9 below) to initiate an action to remediate a malicious connection, such as by causing the malware on a client device 110 to uninstall itself.

Figure 9:
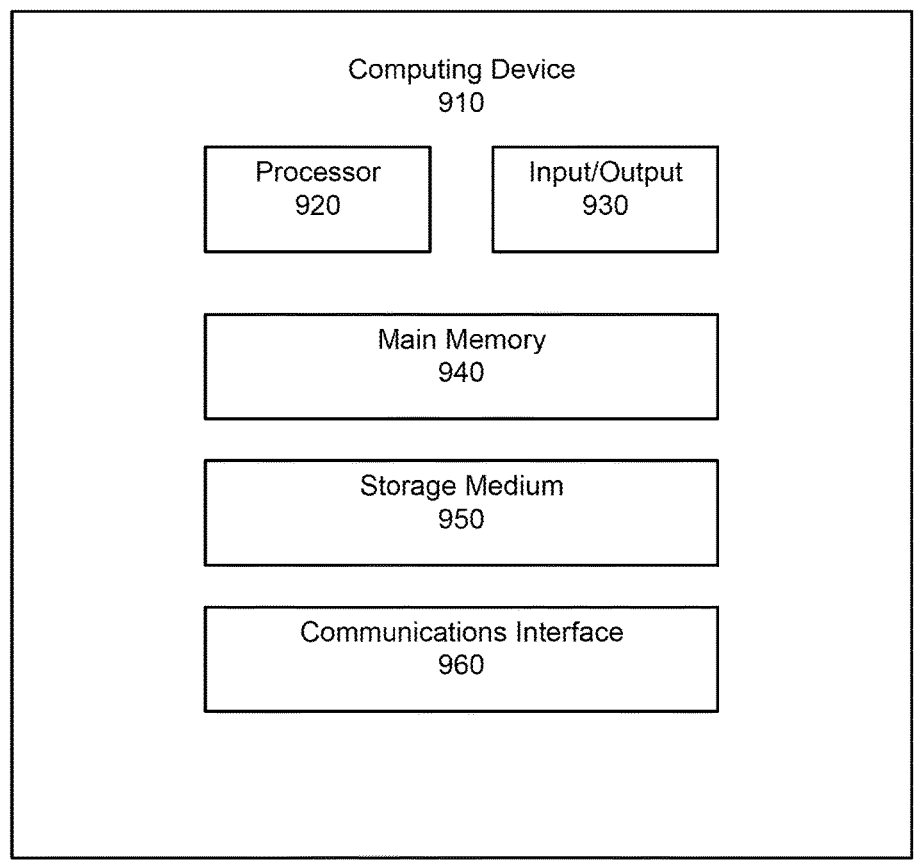
FIG. 9 illustrates a diagram of an example computer system for implementing embodiments consistent with the present disclosure.

FIG. 9 is a block diagram illustrating an example computer system 900 that may be used for implementing embodiments consistent with the present disclosure, including the example systems and methods described herein. Computer system 900 may include one or more computing devices 910. Computer system 900 may be used to implement client device(s) 110, blackhole system(s) 132, firewall(s) 134, DNS server(s) 136, proxy server(s) 138, and/or malicious system(s) 150. The arrangement and number of components in computer system 900 is provided for purposes of illustration. Additional arrangements, number of components, or other modifications may be made, consistent with the present disclosure.

As shown in FIG. 9, a computing device 910 may include one or more processors 920 for executing instructions. Processors suitable for the execution of instructions may include, by way of example, both general and special purpose microprocessors, and any one or more processors of any kind of digital computer. A computing device 910 may also include one or more input/output (I/O) devices 930. By way of example, I/O devices 930 may include keys, buttons, mice, joysticks, styluses, etc. Keys and/or buttons may be physical and/or virtual (e.g., provided on a touch screen interface). A computing device 910 may also be connected to one or more displays (not shown) via I/O 930. A display may be implemented using one or more display panels, which may include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, or any combination of the above types of displays.

A computing device 910 may include one or more storage devices configured to store data and/or software instructions used by processor(s) 920 to perform operations consistent with disclosed embodiments. For example, a computing device 910 may include main memory 940 configured to store one or more software programs that, when executed by processor(s) 920, cause processor(s) 920 to perform functions or operations consistent with disclosed embodiments. In some embodiments, the one or more storage devices may be configured to store data and/or software instructions used by processor(s) 920 to perform the operations of protocol guesser 210, protocol implementer 220, infection analyzer 230, action generator 240, and/or any one or more protocol subsystems (e.g., protocol 1 subsystem 610, protocol 2 subsystem 620, protocol 3 subsystem 630, protocol 4 subsystem 640) of blackhole system(s) 132. In some embodiments, a computing device 910 may use application programming interfaces (APIs) to request information and generate events. For example, the APIs may serve to standardize methods and techniques for blackholing known bad domains. The APIs may also take actions across a set of systems to blackhole a domain using IP address routing and the DNS.

By way of example, main memory 940 may include NOR or NAND flash memory devices, read only memory (ROM) devices, random access memory (RAM) devices, etc. A computing device 910 may also include one or more storage medium(s) 950. By way of example, storage medium(s) 950 include hard drives, solid state drives, tape drives, redundant array of independent disks (RAID) arrays, etc. Although FIG. 9 illustrates only one main memory 940 and one storage medium 950, a computing device 910 may include any number of main memories 940 and storage mediums 950. Further, although FIG. 9 illustrates main memory 940 and storage medium 950 as part of computing device 910, main memory 940 and/or storage medium 950 may be located remotely and computing device 910 may be able to access main memory 940 and/or storage medium 950 via network(s) 120, 140.

Storage medium(s) 950 may be configured to store data, and may store data received from one or more of client device(s) 110, blackhole system(s) 132, firewall(s) 134, DNS server(s) 136, proxy server(s) 138, and malicious system(s) 150. The data may take or represent various content or information forms, such as documents, tables, lists, security information, whitelists, blacklists, greylists, watchlists, hop point lists, lists of IP addresses, lists of domain names, software applications, files, and any other type of information and/or content which may be used in security applications, or any combination thereof.

A computing device 910 may further include one or more communications interfaces 960. Communications interface(s) 960 may allow software and/or data to be transferred between client device(s) 110, blackhole system(s) 132, firewall(s) 134, DNS server(s) 136, proxy server(s) 138, and malicious system(s) 150. Examples of a communications interface 960 may include a modem, network interface card (e.g., an Ethernet card), communications port, personal computer memory card international association (PCMCIA) slots and cards, antennas, etc. Communications interface(s) 960 may transfer software and/or data in the form of signals, which may be electronic, electromagnetic, optical, and/or other types of signals. The signals may be provided to/from communications interface(s) 960 via a communications path (e.g., network(s) 120, 140), which may be implemented using wired, wireless, cable, fiber optic, radio frequency (RF), and/or other communications channels.

The disclosed embodiments are not limited to separate programs or computers configured to perform dedicated tasks. For example, a blackhole system 132 may include a computing device 910 that includes a main memory 940 that stores a single program or multiple programs and may additionally execute one or more programs located remotely from blackhole system 132. Similarly, a client device 110, firewall 134, DNS server 136, proxy server 138, and/or malicious system 150 may execute one or more remotely stored programs instead of, or in addition to, programs stored on these devices. In some examples, a blackhole system 132 may be capable of accessing separate server(s) and/or computing devices that generate, maintain, and provide security information.

Although the description above has described the use of blackhole server(s) 132 in the context of malicious software and communications, the disclosure is not so limited. One of skill in the art would recognize that blackhole server(s) 132 implementing the features and embodiments of the present disclosure may intercept any type of network communication based on appropriate criteria, may identify a protocol used in that network communication, and may cause actions to be performed on the basis of that protocol. That is, the features and embodiments disclosed herein are not limited in application to malicious network communications.

The computer-implemented methods disclosed herein may be executed, for example, by one or more processors that receive instructions from one or more non-transitory computer-readable storage mediums. Similarly, systems consistent with the present disclosure may include at least one processor and memory, and the memory may be a non-transitory computer-readable medium.

As used herein, non-transitory computer-readable storage medium refers to any type of physical memory on which information or data readable by a processor may be stored. Examples include random access memory (RAM), read-only memory (ROM), volatile memory, nonvolatile memory, hard drives, compact disc ROMs (CD ROMs), digital versatile discs (DVDs), flash drives, magnetic strip storage, semiconductor storage, optical disc storage, magneto-optical disc storage, and/or any other known physical storage medium. Singular terms, such as "memory" and "computer-readable storage medium," may additionally refer to multiple structures, such as a plurality of memories and/or computer-readable storage mediums.

As referred to herein, a "memory" may comprise any type of computer-readable storage medium unless otherwise specified. A computer-readable storage medium may store instructions for execution by one or more processors, including instructions for causing the one or more processors to performs steps or stages consistent with embodiments disclosed herein. Additionally, one or more computer-readable storage mediums may be utilized in implementing a computer-implemented method.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming language. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations, and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed as new and desired to be protected by Letters Patent of the United States is:

1. A computer-implemented method of determining a malware protocol being used by a malware application to communicate to a malicious system, so that a blackhole system may then use the determined protocol to direct a potentially infected client device to perform a conditional action, the method comprising:

responding to a determination using a list of domain names associated with malicious sources that a domain name received from the potentially infected client device is associated with a malicious system by sending the potentially infected client device an internet protocol (IP) address of the blackhole system rather than an IP address of the malicious system so as to intercept a first network communication from the potentially infected client device at the blackhole system;

determining a malware protocol of the malware application through pattern matching and real-time interaction with the potentially infected client device in an iterative process in which the blackhole system, in response to receiving the first network communication, attempts to establish a connection with the malware application from the potentially infected client device, by sending more than one response communications to that first network communication using a first guessed malware protocol and depending on whether or not that first guessed protocol establishes a connection with the malware application, iteratively using more than one successive, guessed malware protocols from a plurality of protocols, to the infected client device until a successful connection has been made to identify the corresponding guessed malware protocol as a matching protocol; and the blackhole system using the matching protocol to emulate a malicious system by sending an instruction to the malware application to uninstall said malware application stored on the potentially infected client device.

2. The computer-implemented method of claim 1, wherein the first network connection is established between the malware application and a subsystem that implements the malware protocol.

3. The computer-implemented method of claim 1, wherein the conditional action includes gathering, at the potentially infected client device, information about the malware application.

4. The computer-implemented method of claim 1, wherein the conditional action includes gathering, at the potentially infected client device, information about the potentially infected client device and sending said first network communication including the information.

5. The computer-implemented method of claim 1, wherein the conditional action includes gathering, at the infected client device, information about a network connection.

6. The computer-implemented method of claim 1, further comprising:
  intercepting a communication from a compromised computer to the malicious system, wherein the compromised computer is the client device and wherein the communication is the first network communication; and
  remediating malicious activity in the compromised computer by emulating the malicious system while sending the instruction to the malware application.

7. The computer-implemented method of claim 1, further comprising:
  intercepting a communication from a compromised computer to the malicious system, wherein the compromised computer is the client device and wherein the communication is the first network communication; and
  gathering information about malicious activity in the compromised computer by emulating the malicious system while sending the instruction to the malware application.

8. A computer-implemented system for determining a malware protocol being used by a malware application to communicate to a malicious system, so that a blackhole system may then use the determined protocol to direct the client to perform a conditional action, comprising:
  a memory device that stores instructions; and
  one or more processors that execute the instructions to:
  respond to a determination using a list of domain names associated with malicious sources that a domain name received from the potentially infected client device is associated with a malicious system by sending the potentially infected client device an internet protocol (IP) address of the blackhole system rather than an IP address of the malicious system so as to intercept a first network communication from the potentially infected client device at the blackhole system;
  determine a malware protocol of the malware application through pattern matching and real-time interaction with the potentially infected client device in an iterative process in which the blackhole system, in response to receiving the first network communication, attempts to establish a connection with the malware application, by sending more than one response communications to that first communication using a first guessed malware protocol and depending on whether or not that first guessed protocol establishes a connection with the malware application, iteratively using more than one successive, guessed malware protocols from a plurality of protocols, to the potentially infected client device until a successful connection has been made to identify the corresponding guessed malware protocol as a matching protocol; and
  use the matching protocol, by the blackhole system, to emulate a malicious system by sending an instruction to the malware application to uninstall said malware application stored on the potentially infected client device.

9. The system of claim 8, wherein the connection is established between the malware application and a subsystem that implements the malware protocol.

10. The system of claim 8, wherein the conditional action includes gathering, at the potentially infected client device, information about the malware application.

11. The system of claim 8, wherein the conditional action includes gathering, at the potentially infected client device, information about the potentially infected client device and sending a network communication including the information.

12. The system of claim 8, wherein the conditional action includes gathering, at the infected client device, information about a network connection.

13. A non-transitory computer-readable medium storing instructions that, when executed by one or more processors, cause the one or more processors to perform a method of
  using a list of domain names associated with malicious sources so as to determine a malware protocol being used by a malware application to communicate to a malicious system, so that a blackhole system may then use the determined protocol to direct a client device to perform a conditional action, the method comprising:
  responding to a determination using said list of domain names associated with malicious sources that a domain name received from the potentially infected client device is associated with a malicious system by sending the potentially infected client device an internet protocol (IP) address of the blackhole system rather than an IP address of the malicious system so as to intercept a first network communication from the potentially infected client device at the blackhole system;
  determining a malware protocol of the malware application through pattern matching and real-time interaction with the potentially infected client device in an iterative process in which the blackhole system, in response to receiving the first network communication, attempts to establish a connection with the malware application, by sending more than one response communications to that first communication using a first guessed malware protocol and depending on whether or not that first guessed protocol establishes a connection with the malware application, iteratively using more than one successive, guessed malware protocols from a plurality of protocols, to the infected client device until a successful connection has been made to identify the corresponding guessed malware protocol as a matching protocol; and
  the blackhole system using the matching protocol to emulate a malicious system by sending an instruction to the malware application to uninstall said malware application stored on the potentially infected client device.

14. The non-transitory computer-readable medium of claim 13, wherein the conditional action includes gathering, at the infected client device, information about the malware application.

15. The non-transitory computer-readable medium of claim 13, wherein the conditional action includes gathering, at the infected client device, information about the infected client device.

16. The non-transitory computer-readable medium of claim 13, wherein the conditional action includes gathering, at the infected client device, information about a network connection.

* * * * *